United States Patent
Arikawa et al.

(10) Patent No.: US 10,108,847 B2
(45) Date of Patent: Oct. 23, 2018

(54) EYEGLASS WEARING IMAGE ANALYSIS DEVICE, EYEGLASS WEARING IMAGE ANALYSIS METHOD, AND STORAGE MEDIUM HAVING EYEGLASS WEARING IMAGE ANALYSIS PROGRAM STORED

(71) Applicant: NIDEK CO., LTD., Aichi (JP)

(72) Inventors: Toru Arikawa, Aichi (JP); Yoshihiro Ozaki, Aichi (JP)

(73) Assignee: NIDEK CO., LTD., Aichi (JP)

( * ) Notice: Subject to any disclaimer, the term of this patent is extended or adjusted under 35 U.S.C. 154(b) by 0 days.

(21) Appl. No.: 14/631,042

(22) Filed: Feb. 25, 2015

(65) Prior Publication Data

US 2015/0242677 A1  Aug. 27, 2015

(30) Foreign Application Priority Data

Feb. 27, 2014 (JP) .................... 2014-037352
Jan. 16, 2015 (JP) .................... 2015-006469

(51) Int. Cl.
G06K 9/00 (2006.01)
G02C 13/00 (2006.01)

(52) U.S. Cl.
CPC ....... G06K 9/00214 (2013.01); G02C 13/003 (2013.01); G02C 13/005 (2013.01)

(58) Field of Classification Search
None
See application file for complete search history.

(56) References Cited

U.S. PATENT DOCUMENTS 6,607,271 B2 *  8/2003  Bar .................... G02C 13/005
                                                   351/159.74
2004/0189935 A1   9/2004  Warden
2007/0291231 A1 * 12/2007  Hammoud ......... G06K 9/00604
                                                   351/222

FOREIGN PATENT DOCUMENTS

EP        1728467 A1    12/2006

OTHER PUBLICATIONS

Extended European Search Report dated Jul. 6, 2015 for the corresponding European Patent Application No. 15156528.0.

* cited by examiner

*Primary Examiner* — Mark Roz
(74) *Attorney, Agent, or Firm* — Rankin, Hill & Clark LLP

(57) ABSTRACT

An eyeglass wearing image analysis device includes: an acquisition unit that acquires eyeglass frame type information; and a controller that performs a control operation based on the eyeglass frame type information.

15 Claims, 8 Drawing Sheets

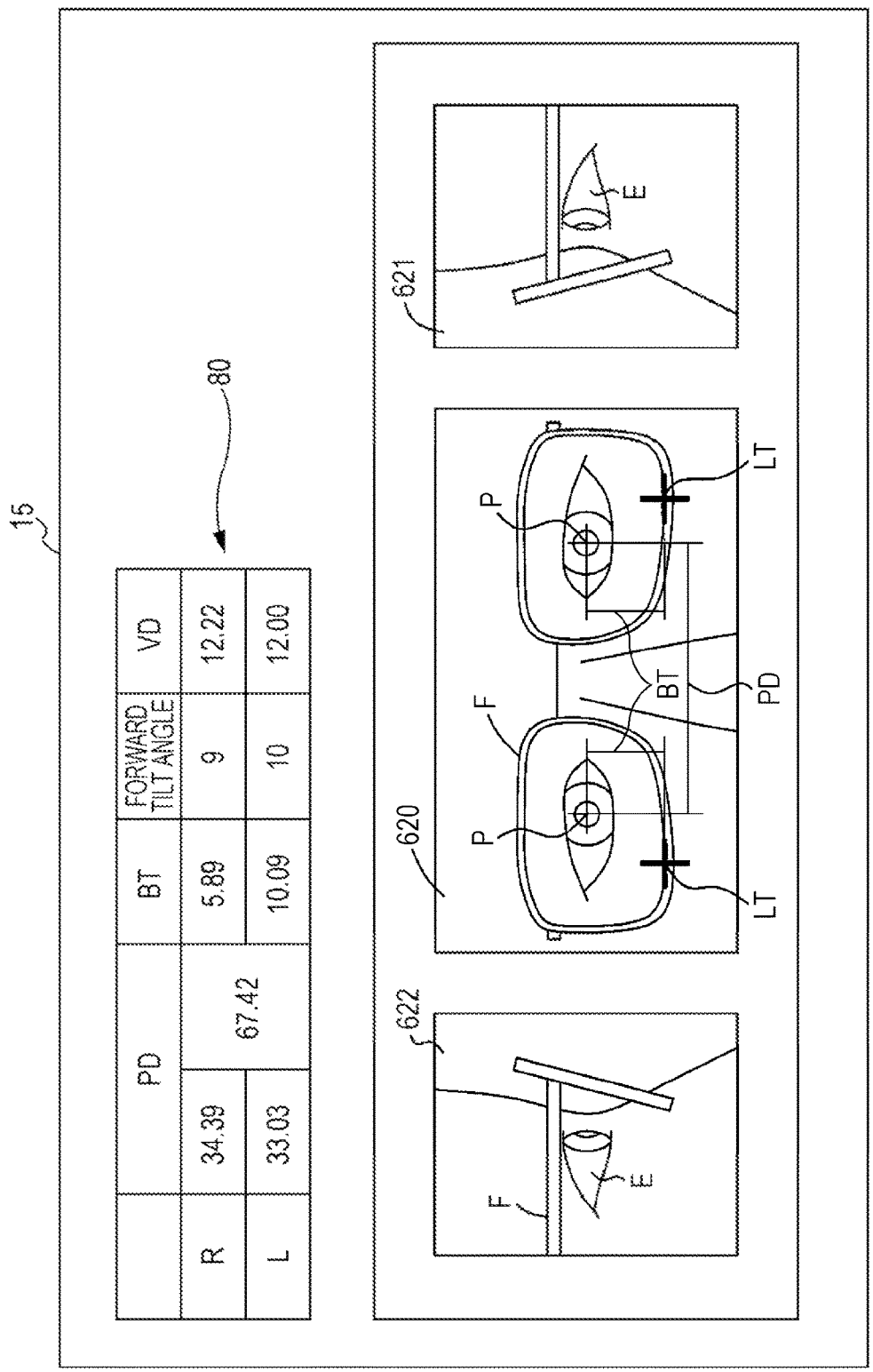

EYEGLASS WEARING IMAGE ANALYSIS DEVICE, EYEGLASS WEARING IMAGE ANALYSIS METHOD, AND STORAGE MEDIUM HAVING EYEGLASS WEARING IMAGE ANALYSIS PROGRAM STORED

CROSS-REFERENCE TO RELATED APPLICATION

This application claims priority from Japanese Patent Application Nos. 2014-037352 filed with the Japan Patent Office on Feb. 27, 2014, and 2015-006469 filed with the Japan Patent Office on Jan. 16, 2015, the entire contents of which are hereby incorporated by reference.

BACKGROUND

1. Technical Filed

The present disclosure relates to an eyeglass wearing image analysis device, an eyeglass wearing image analysis method, and a storage medium having an eyeglass wearing image analysis program stored therein.

2. Related Art

An eyeglass wearing image analysis device has been proposed that obtains an image of the face of an examinee wearing an eyeglass frame taken using an imaging device, and that calculates eyeglass wearing parameters from the image for manufacturing eyeglasses (JP-A-2007-216049).

In a conventional device, in order to measure eyeglass wearing parameters from a photographed image, the position of the eyeglass frame on the photographed image is detected with reference to an attachment or seal and the like attached to the eyeglass frame in advance (JP-T-2010-503885). When the image is taken without attaching the attachment or seal and the like to the eyeglass frame, the eyeglass frame position is detected by detecting an edge of the eyeglass frame on the photographed image.

SUMMARY

An eyeglass wearing image analysis device according to an embodiment of the present disclosure includes: an acquisition unit that acquires eyeglass frame type information; and a controller that performs a control operation based on the eyeglass frame type information.

BRIEF DESCRIPTION OF DRAWINGS

FIG. 8 is a diagram of an example of a screen displayed on the display unit at the end of a photographed image analysis.

DETAILED DESCRIPTION

Figure 1:
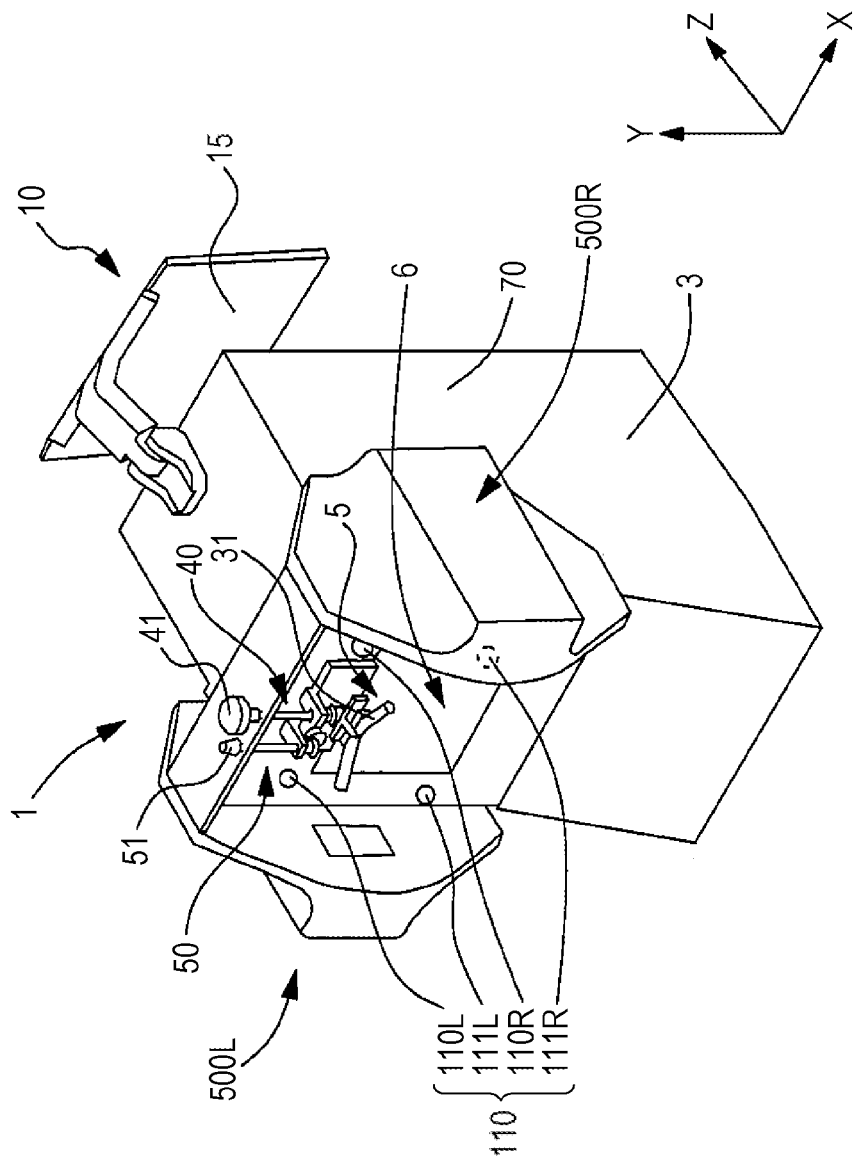
FIG. 1 is a schematic exterior configuration diagram of an eyeglass wearing image analysis device according to an example.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

For example, when an eyeglass wearing parameter is acquired from eyeglasses being worn by an examinee, it is sometimes difficult to take a good picture of the examinee depending on the type of the eyeglass frame. As a result, the eyeglass frame may not be accurately detected, and therefore the photographing and measuring may not be completed in a preferable manner.

In view of the above problem, the present disclosure relates to the provision of an eyeglass wearing image analysis device, an eyeglass wearing image analysis method, and a storage medium having an eyeglass wearing image analysis program stored therein that allow the examinee wearing eyeglasses to be photographed and measured in a preferable manner.

In order to solve the problem, the present disclosure is characterized by the following configurations.

(1) An eyeglass wearing image analysis device according to the first embodiment of the present disclosure includes: an acquisition unit for acquiring eyeglass frame type information; and a controller for performing a control operation based on the eyeglass frame type information.

(2) An eyeglass wearing image analysis device according to the second embodiment of the present disclosure includes a controller that performs a first control operation corresponding to a first eyeglass frame type and a second control operation different from the first control operation and corresponding to a second eyeglass frame type different from the first eyeglass frame type.

(3) An eyeglass wearing image analysis method according to the third embodiment of the present disclosure is for measuring an eyeglass wearing parameter of an examinee by analyzing an image of the examinee wearing eyeglasses, and includes: acquiring eyeglass frame type information; and performing a control operation based on the eyeglass frame type information.

(4) An eyeglass wearing image analysis program according to the fourth embodiment of the present disclosure is for causing a computer to function as an eyeglass wearing image analysis device that implements acquisition of eyeglass frame type information and performance of a control operation based on the eyeglass frame type information.

(5) An eyeglass wearing image analysis program according to the fifth embodiment of the present disclosure is a non-transitory storage medium storing the eyeglass wearing image analysis program described in above (4).

According to the device, method, and storage medium of the present disclosure, the examinee wearing eyeglasses can be photographed and measured in a preferable manner so as to acquire an eyeglass wearing parameter.

In the following, embodiments will be described in detail.

<Overview>

The overview of an eyeglass wearing image analysis device according to an embodiment of the present disclosure will be described. An eyeglass wearing image analysis device 1 mainly includes an illuminating optical system, a measuring optical system (such as a far measuring optical system or a near measuring optical system), an optical path switching unit, and a controller.

The eyeglass wearing image analysis device is used for measuring an eyeglass wearing parameter of the examinee by analyzing an image of the examinee wearing eyeglasses.

The measuring optical system is used for taking the examinee image.

The eyeglass wearing image analysis device includes an acquisition unit and the controller. In the present embodiment, the acquisition unit and the controller are combined. Obviously, the eyeglass wearing image analysis device may be provided with the acquisition unit and the controller separately. In the present embodiment, the controller is used as an acquisition unit and a controller.

The acquisition unit acquires eyeglass frame type information. The eyeglass frame type includes, for example, the shape of the eyeglass frame, the material of the eyeglass frame, the color of the eyeglass frame, the design of the eyeglass frame, and eyeglass frame configuration information. The shape of the eyeglass frame includes, for example, full rim, two-point, and Nylor. The eyeglass frame configuration information includes, for example, the target shape of the lens of the eyeglass frame, the warp angle of the eyeglass frame, and the pantoscopic angle of the eyeglass frame.

The eyeglass wearing image analysis device may be configured such that, in order to acquire the eyeglass frame type information, for example, the eyeglass frame type information is input by an operation by the examiner. The examiner input includes, for example, direct input of the eyeglass frame type information, and selection from eyeglass frame types stored in a memory of the eyeglass wearing image analysis device. In another example, in order to acquire the eyeglass frame type information, the eyeglass wearing image analysis device may be configured such that, before an eyeglass wearing parameter of the examinee is acquired, the eyeglass frame type is set, after the eyeglass frame is detected, based on the result thereof (such as the thickness of the eyeglass frame). In yet another example, in order to acquire the eyeglass frame type information, the eyeglass wearing image analysis device may be configured to receive an image separately input by a different device.

The controller performs a control operation based on the eyeglass frame type information. This enables a control operation in accordance with the eyeglass frame type. Therefore, the examinee wearing eyeglasses can be photographed and measured in a preferable manner.

The control operation based on the eyeglass frame type information includes, for example, using the eyeglass frame type information when controlling the respective members of She eyeglass wearing image analysis device. Examples of the control of the respective members of the eyeglass wearing image analysis device using the eyeglass frame type information include light amount adjustment of a light source of each optical system; gain adjustment of an imaging element of each optical system; adjustment of the position of each optical system; and switching of the direction in which the examinee is photographed.

The control operation based on the eyeglass frame type information also includes, for example, using the eyeglass frame type information when acquiring an eyeglass wearing parameter. In this case, the controller acquires the eyeglass wearing parameter based on the eyeglass frame type information. Thus, the eyeglass wearing parameter corresponding to the eyeglass frame type can be acquired.

The eyeglass wearing parameter includes, for example, pupil information (such as pupil position and pupil diameter), frame information (such as the width and frame position of the frame), and a pupillary distance and eye position height (fitting point height) determined from the pupil information and frame information. The eyeglass wearing parameter also includes an eyeglass wearing parameter calculated by extracting the frame portion from a lateral image (such as frame pantoscopic angle and eyeglass wearing distance).

The acquisition of the eyeglass wearing parameter includes selecting an analyzing process method for analyzing and processing the image of the examinee wearing eyeglasses, and performing an image analysis based on the selected analyzing process method. The selected analyzing process method includes a plurality of analyzing process methods with different threshold values for edge detection at various portions (such as the eyeglass frame and the examinee's pupil). The selected analyzing process method may also include a first analyzing process method and a second analyzing process method with different computing process methods for detecting the various portions. For example, the first analyzing process method is an analyzing process method with high processing speed which is used when detection of the eyeglass frame is easy. The second analyzing process method may be an analyzing process method with low processing speed but high detection accuracy which is used when detection of the eyeglass frame is difficult. Thus, an appropriate analyzing process method is selected in accordance with the eyeglass frame type depending on what is considered important (such as detection speed or detection accuracy) when detecting the various portions. In this way, the eyeglass wearing parameter can he acquired in a preferable manner.

The acquisition of the eyeglass wearing parameter also includes correction of the eyeglass wearing parameter based on the eyeglass frame type information. Namely, an appropriate eyeglass wearing parameter for the eyeglass frame type is acquired. Thus, in order to transmit the acquired data to the eyeglass lens processing device and the like, layout data and the like corresponding to the eyeglass frame type can be acquired. Specifically, the examiner does not need to make an external device setting based on the information of the various eyeglass wearing parameters and eyeglass frame types and the like. Accordingly, operations using the lens processing device and the Like can be smoothly performed. Further, the examiner can perform preferable lens processing and the like for the eyeglass frame type.

The acquisition of the eyeglass wearing parameter may include a plurality of combined processes. For example, the acquisition includes image processing using the analyzing process method selected in accordance with the eyeglass wearing parameter, and correction of the eyeglass wearing parameter acquired by the image analysis process based on the eyeglass wearing parameter.

The eyeglass wearing image analysis device may be further provided with a transmission unit for transmitting the eyeglass frame type information and eyeglass wearing parameter to an external device. In the present embodiment, the acquisition unit, the controller, and the transmission unit are combined. Obviously, the acquisition unit, the controller, and the transmission unit may be separately provided. In the present embodiment, the controller 70 may be used as the transmission unit. Examples of the external device include a lens processing device, a tracer, and a blocker. Thus, the eyeglass frame type information can be transmitted to the external device together with the acquired eyeglass wearing parameter, so that the examiner does not need to make an external device setting based on the information of the various eyeglass wearing parameters and eyeglass frame types and the like. Accordingly, the examiner can smoothly transition to the next operation.

In the present embodiment, the eyeglass wearing image analysis device may include a controller that performs a first control operation corresponding to a first eyeglass frame type, and a second control operation different from the first control operation and corresponding to a second eyeglass frame type different from the first eyeglass frame type. The first eyeglass frame type and the second eyeglass frame type include, for example, the shape of the eyeglass frame, the material of the eyeglass frame, the color of the eyeglass frame, and the design of the eyeglass frame, as described above.

The first control operation and the second control operation include controlling each member of the eyeglass wearing image analysis device. The control of each member of the eyeglass wearing image analysis device may include light amount adjustment of the light source of each optical system, gain adjustment of the imaging element, of each optical system, and adjustment of the position of each optical system.

The first control operation and the second control operation include acquisition of the eyeglass wearing parameter. The acquisition of the eyeglass wearing parameter includes selection of an analyzing process method suitable for the eyeglass frame type, image analysis based on the selected analyzing process method, and correction of the acquired eyeglass wearing parameter to an eyeglass wearing parameter corresponding to the eyeglass frame type.

EXAMPLES

In the following, the present embodiment will be described with reference to the drawings. FIGS. 1 to 8 illustrate the configuration of the eyeglass wearing image analysis device according to an embodiment of the present disclosure. In the following description, the left-right direction of the examinee corresponds to an X-axis direction, the upper-lower direction of the examinee corresponds to a Y-axis direction, and the front-rear direction of the examinee corresponds to a Z-axis direction.

Figure 2:
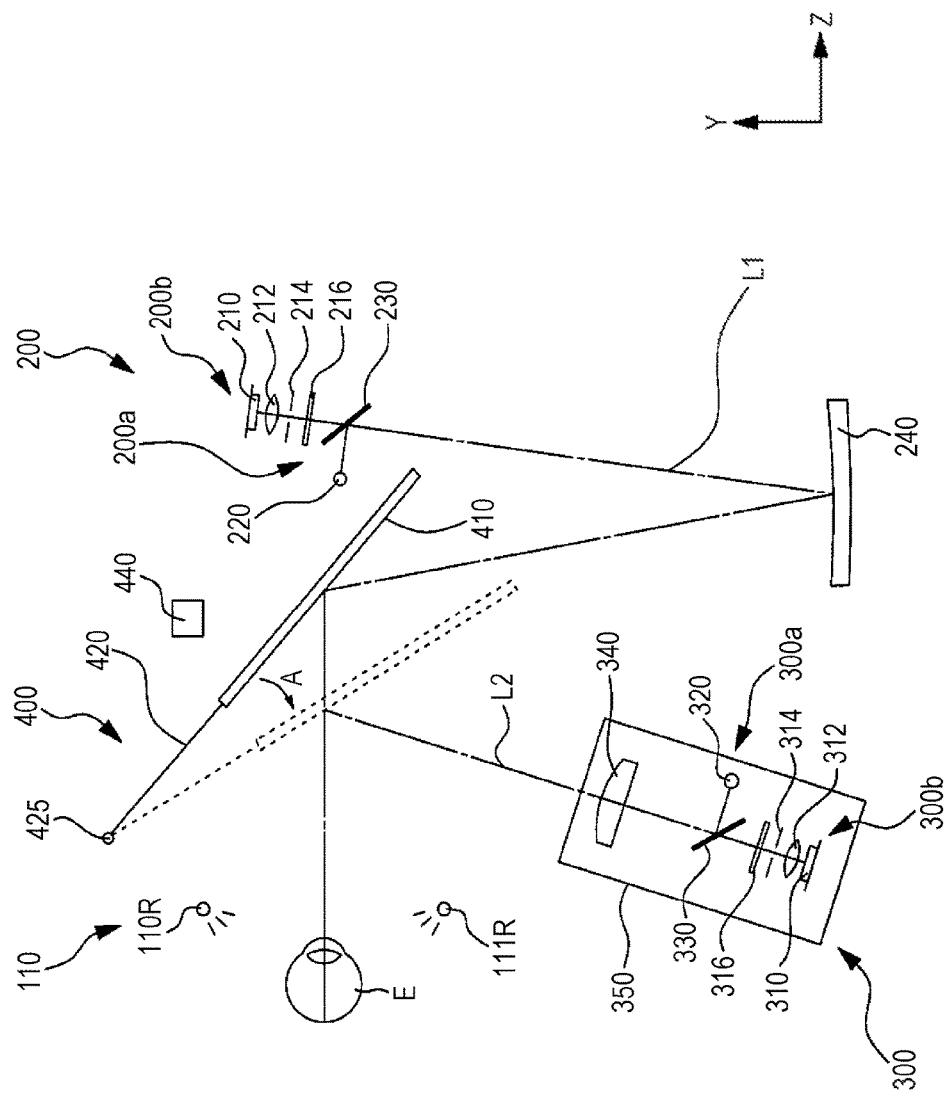
FIG. 2 is a schematic diagram of optical systems housed in the eyeglass wearing image analysis device according to the present example.

FIG. 1 is a schematic exterior configuration diagram of the eyeglass wearing image analysis device 1 according to the present example. FIG. 2 is a schematic diagram of optical systems housed in the eyeglass wearing image analysis device 1 according to the present example. In the following, the configuration of the eyeglass wearing image analysis device 1 according to the present example will be described with reference to FIGS. 1 and 2. Referring to FIG. 1, the eyeglass wearing image analysis device has a device body 3 in which various systems such as a measuring optical system, a drive system, and a control system are contained, as will be described below. The device body 3 is provided with a presentation window 6 on the examinee side. The presentation window 6 is a window for passing a fixation light flux so as to present the examinee with a fixation target. Also on the examinee side of the device body 3, a face support unit 5 is installed. The face support unit 5 is a unit for supporting the face of the examinee. On the examiner side of the device body 3, an operation unit 10 is mounted.

<Operation Unit>

The operation unit 10 outputs a signal corresponding to an input operation instruction, to a controller 70 which will be described below. In the present example, as the operation unit 10, a touch panel display unit 15 is used. Specifically, in the present example, the operation unit is combined with a display unit. Obviously, the operation unit and the display unit may be separately provided. As the operation unit 10, at least one of operation units, such as a mouse, joystick, or a keyboard, may be used. The display unit 15 may be a display mounted on the body of the eyeglass wearing image analysis device 1, or a display connected to the body. Obviously, the display unit 15 may not be of touch panel type. As the display unit 15, the display of a personal computer (hereafter referred to as "PC") may be used. A plurality of displays may be used in combination. Various images displayed on the display unit 15 include a frontal image and a lateral image that have been taken in distant vision state or near vision state.

<Face Support Unit>

The face support unit 5 supports the examinee's forehead. The face support unit 5 maintains a constant distance between the measuring optical systems (a far measuring optical system 200, a near measuring optical system 300, a reflecting mirror 410 and the like), which will be described later, and the examinee. The face support unit 5 is configured to be rotatable in the left-right direction of the examinee, allowing adjustment of the orientation of the face of the examinee. In this way, when the orientation of the face of the examinee is displaced to either left or right, the face support unit 5 can be rotated so that the face of the examinee faces the front of the eyeglass wearing image analysis device.

The face support unit 5 mainly includes an abutting portion 31, an actuation distance adjusting unit 40, and a left-right rotation adjusting unit 50. The abutting portion 31 is a portion that contacts the face of the examinee. The actuation distance adjusting unit 40 adjusts the position of the abutting portion 31 in the Z-axis direction so as to adjust the distance between the examinee and the measuring optical systems, which will be described later. Specifically, as the examiner operates an adjusting knob 41 of the actuation distance adjusting unit 40, the position of the abutting portion 31 in the Z-axis direction (actuation distance direction) is adjusted. A horizontal pivot adjusting unit 50 adjusts the angle of the abutting portion 31 in the left-right direction so that the face of the examinee faces the front of the eyeglass wearing image analysis device. Specifically, as the examiner operates an adjusting knob 51 of the left right rotation adjusting unit 50, the position of the abutting portion 31 in the left-right direction is adjusted.

The configuration of the face support unit 5 is not limited to the configuration of the present example. In the eyeglass wearing image analysis device according to the present example, the examinee's forehead is supported. However, the face support unit 5 may support the jaw, cheeks, or nose of the examinee. In the present example, the face support unit 5 is configured such that the position of the abutting portion 31 is adjusted as the examiner operates the adjusting knobs 41 and 51. However, the face support unit 5 may be configured such that the position of the abutting portion 31 is electrically adjusted by the operation and the like of the operation unit 10 using a drive unit, such as a motor.

<Optical Systems>

Referring to FIG. 2, the optical systems housed in the eyeglass wearing image analysis device 1 according to the present embodiment will be described. The eyeglass wearing image analysis device 1 mainly includes an illuminating optical system 110, a far measuring optical system 200, a near measuring optical system 300, an optical path switching unit 400, and a lateral photographing optical system 500.

In the present example, in order to measure the eyeglass parameter, the examinee wearing eyeglasses is photographed. For this purpose, at least the far measuring optical system 200 or the near measuring optical system 300 is used.

In the present example, the far measuring optical system 200 and the near measuring optical system 300 are used for taking a frontal image of the examinee. The lateral photographing optical system 500 is used for taking a lateral image of the examinee.

<Illuminating Optical System>

The illuminating optical system 110 mainly includes four light sources 110R, 110L, 111R, and 111L (in FIG. 2, light sources 110L and 111L are omitted). The illuminating optical system 110 illuminates the face of the examinee from four directions using the light sources 110R, 110L, 111R, and 111L. Obviously, the configuration of the illuminating optical system 100 is not limited to the above configuration. The number of the light sources is not particularly limited, and the light sources may be located as desired. The illuminating optical system 110 only needs to be configured such that the face of the examinee can be illuminated using a light source. Thus, for example, the illuminating optical system 110 may be disposed under the face support unit 5 or above the presentation window 6.

In the illuminating optical system 110 according to the present example, infrared light sources are used. By using the infrared light sources and an infrared filter as will be described below, the influence of disturbance light (such as natural light) can be suppressed. A visible light source other than the infrared light sources may also be used.

<Far Measuring Optical System>

Referring to FIG. 2, the far measuring optical system (which may be hereafter referred to as a first measuring optical system) 200 will be described. The far measuring optical system 200 is an optical system for measuring the position of an examinee's eye E (eye position) with respect to an eyeglass frame in distant vision state. The far measuring optical system 200 includes a first fixation target projecting optical system 200*a* and a first imaging optical system 200*b*. The far measuring optical system 200 has a measurement optical axis which is referred to as an optical axis L1.

The fixation target projecting optical system 200*a* projects a distance fixation target onto the examinee's eye E for having the examinee fixated in a distant vision state. The fixation target projecting optical system 200*a* mainly includes a light source 220, a half mirror 230, and a concave mirror 240. The light source 220 functions as a fixation target projected onto the examinee's eye E. The concave mirror 240 reflects a fixation target light flux emitted from the light source 220, producing a reflected light flux which is nearly a parallel light flux. In the present example, the optical system 200*a* is configured such that the fixation target light flux emitted from the light source 220 becomes a nearly parallel light flux after being reflected. However, the configuration of the optical system 200*a* is not limited to the above. For example, the fixation target light flux emitted from the light source 220 may be reflected so as to provide a predetermined presentation distance.

The emitted fixation target light flux is reflected by the half mirror 230 and made coaxial with the optical axis L1. The fixation target light flux reflected by the half mirror 230 is reflected by the concave mirror 240. The fixation target light flux reflected by the concave mirror 240 is reflected by the reflecting mirror 410 as will be described below, and then enters the examinee's eye E through the presentation window 6. The concave mirror 240 reflects the fixation target light flux to produce a nearly parallel light flux. Thus, the fixation target as viewed from the examinee appears at a distance greater than the actual distance from the examinee's eye E to the light source 220.

The imaging optical system 200*b* photographs the face of the examinee in the distant vision state from the frontal direction (i.e., at a position opposite the front of the face of the examinee). In the present example, the imaging optical system 200*b* photographs the face of the examinee in the distant vision state from the frontal position. Obviously, the imaging optical system 200*b* may be configured such that the face of the examinee is photographed from a diagonally lower direction (diagonally lower position) with respect to the frontal direction. The face of the examinee does not necessarily mean the face of the examinee as a whole. The face of the examinee may refer to a region at least around the examinee's eye E (for example, a frontal image of the face of the examinee including at least one of the left and right eyes and the eyeglass frame). The imaging optical system 200*b* mainly includes an imaging element 210, an imaging lens 212, a diaphragm 214, an infrared filter 216, a half mirror 230, and a concave mirror 240.

The illuminating light from the illuminating optical system 110 is reflected by the face of the examinee and then passes through the presentation window 6. The illuminating light that has passed through the presentation window 6 is reflected by the reflecting mirror 410. The light reflected by the reflecting mirror 410 is reflected by the concave mirror 240, and passes through the half mirror 230 and the infrared filter 216. The infrared light that has passed through the infrared filter 216 passes through the diaphragm 214 and is converged by the imaging lens 212, forming an image on the imaging element 210. The imaging element 210 is in a conjugate positional relationship with the pupil. The imaging element 210 detects the light and outputs a corresponding detection signal to the controller 70.

<Near Measuring Optical System>

The near measuring optical system (which may be hereafter referred to as a second measuring optical system) 300 is an optical system for measuring the eye position of the examinee's eye E in near vision state. The near measuring optical system 300 includes a second fixation target projecting optical system 300*a* and a second imaging optical system 300*b*.

The fixation target projecting optical system 300*a* projects a near fixation target onto the examinee's eye E from a diagonally lower direction so as to have the examinee fixated in near vision state. The fixation target projecting optical system 300*a* mainly includes a light source 320, a half mirror 330, and a convex lens 340. The light source 320 functions as a fixation target projected onto the examinee's eye E.

A fixation target light flux emitted from the light source 320 is reflected by the half mirror 330 and made coaxial with the optical axis L2. The fixation target light flux reflected by the half mirror 330 passes through the convex lens 340 and is converged. Thereafter, the fixation target light flux is reflected by the reflecting mirror 410 as will be described below, passes through the presentation window 6, and then enters the examinee's eye E.

The imaging optical system 300*b* photographs the face of the examinee in near vision state from the frontal direction (i.e., from a position opposite the front of the face of the examinee). In the present example, the imaging optical system 300*b* photographs the face of the examinee in near vision state from a diagonally lower direction (diagonally lower position). Obviously, however, the imaging optical system 300*b* may be configured such that the face of the examinee is photographed from the frontal position. The imaging optical system 300*b* mainly includes an imaging element 310, an imaging lens 312, a diaphragm 314, an infrared filter 316, a half mirror 330, and a convex lens 340.

The illuminating light from the illuminating optical system 110 illuminating the face of the examinee passes through the presentation window 6 and is then reflected by the reflecting mirror 410. The light reflected by the reflecting mirror 410 passes through the convex lens and is converged. The converged light flux passes through the half mirror 330 and the infrared filter 316. The infrared light that has passed through the infrared filter 316 passes through the diaphragm 314 and is then converged by the imaging lens 312, forming an image on the imaging element 310. The imaging element 310 is in a conjugate positional relationship with the pupil. The imaging element 310 detects the light and outputs a detection signal to the controller 70.

<Optical System Moving Unit>

The near measuring optical system 300 includes an optical system moving unit 350. The optical system moving unit 350 holds the near measuring optical system 300 in a movable manner. The optical system moving unit 350 is configured to move the near measuring optical system 300 as a whole as the angle of the reflecting mirror 410 is modified during near measurement.

When the angle of the reflecting mirror 410 is modified by the optical path switching unit 400 as will be described below, the optical path (target presentation distance) of the fixation target projecting optical system 300a, and the optical path of the second imaging, optical system 300b are changed. Thus, as the angle of the reflecting mirror 410 is modified, the optical system moving unit 350 according to the present embodiment moves the near measuring optical system 300 as a whole. In this way, when the angle of the reflecting mirror 410 is modified, the near target presentation distance is maintained. A focus state of the second imaging optical system 300b with respect to the examinee's eye E is also maintained.

The optical system moving unit 350 is also configured to move the convex lens 340 for adjusting the presentation distance and the light source 320 for projecting the fixation target separately. In this way, the optical system moving unit 350 can modify the fixation target presentation distance by changing the relative distance between the convex lens 340 and the light source 320. The optical system moving unit 350 moves the optical members using a drive unit which is not shown, such as a motor.

<Optical Path Switching Unit>

The optical path switching unit 400 switches the optical path between the far measuring optical system 200 and the near measurement optical system 300. The optical path switching unit 400 also modifies the direction of the visual line of the examinee during near measurement.

The optical path switching unit 400 mainly includes a reflecting mirror 410, a mirror holder portion 420, and a drive unit 440.

The reflecting mirror 410 is held onto the mirror holder portion 420. An upper part of the mirror holder portion 420 is held onto a rotation shaft 425 affixed to the device. The mirror holder portion 420 is configured to be pivotable about a rotating shaft of the rotation shaft 425. Specifically, the mirror holder portion 420 is integrally pivotable with the reflecting mirror 410. The reflecting mirror 410 reflects the target light flux emitted from the far measuring optical system 200 or the near measuring optical system 300 toward the examinee's eye E. The drive unit 440 is linked with the rear surface of the mirror holder portion 420 via a link mechanism portion, which is not shown. As the drive unit 440 is driven, driving force of the drive unit is transmitted to the mirror holder portion 420 via the link mechanism portion. The driving force transmitted from the link mechanism portion causes the mirror holder portion 420 to pivot about the rotation shaft 425. As the mirror holder portion pivots, the reflecting mirror 410 is pivotally moved about the rotation shaft 425.

Pivoting of the reflecting mirror 410 modifies the optical path of the target light flux, whereby the presentation position of the fixation target projected onto the examinee's eye E is modified. The modification of the fixation target presentation position results in a modification of the direction of the visual line of the examinee. For example, when the reflecting mirror is rotated in direction A (i.e., moved from the solid line to the broken line), the optical path for photography of the examinee is switched from the optical path of the far measuring optical system 200 to the optical path of the near measurement optical system 300. Thus, the optical path switching unit 400 changes the direction of the visual line of the examinee in the upper-lower direction by changing the fixation target presentation position through pivotal movement of the reflecting mirror 410.

<Lateral Photographing Optical System>

Figure 3:
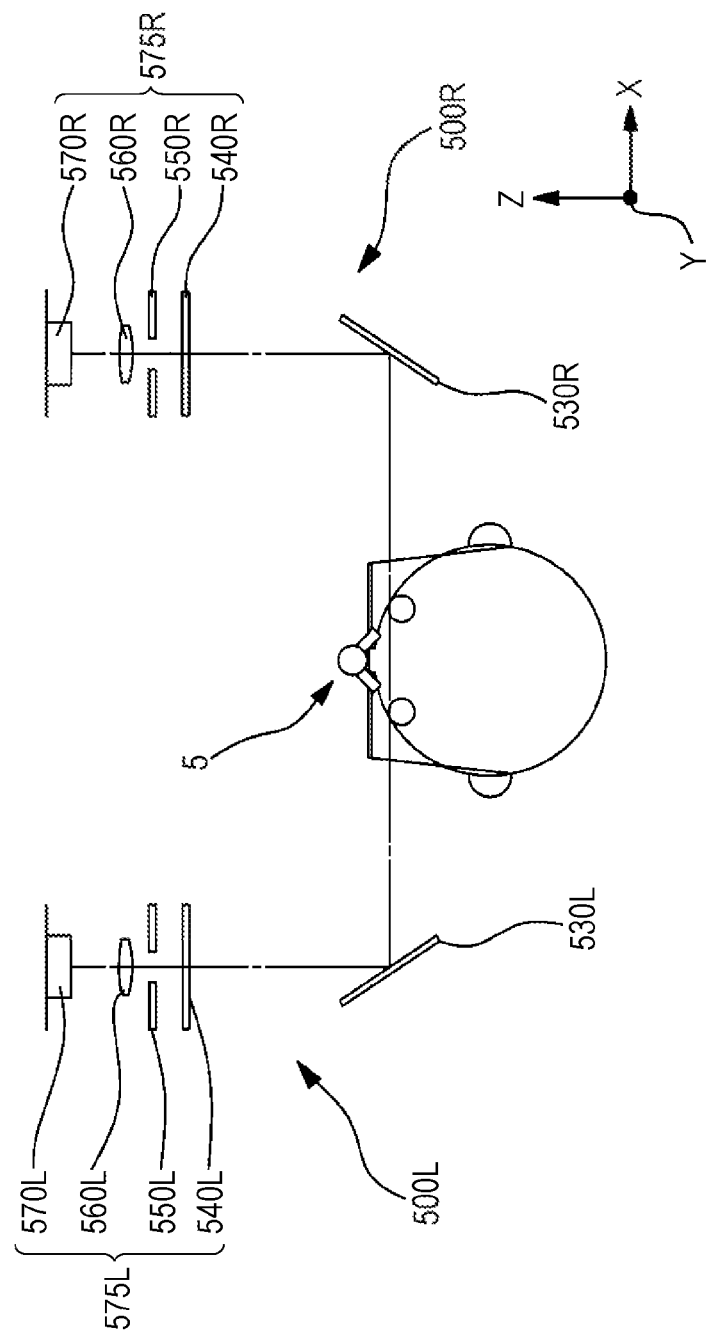
FIG. 3 is a schematic diagram of a lateral photographing optical system.

FIG. 3 is a schematic diagram of the lateral photographing optical system 500. The lateral photographing optical system 500 acquires a lateral image of the examinee by photographing the examinee laterally. As illustrated in FIG. 3, the lateral photographing optical system 500 is affixed in the left-right direction with respect to the position at which the face of the examinee is supported.

In the present example, the lateral photographing optical system 500 includes a left-side photographing optical system 500L disposed to the left of the examinee, and a right-side photographing optical system 500R disposed to the right of the examinee. The left-side photographing optical system 500L photographs the examinee from the left side. The right-side photographing optical system 500R photographs the examinee from the right side.

The left-side photographing optical system 500L mainly includes a half mirror 530L, an infrared filter 540L, a diaphragm 550L, an imaging lens 560L, and an imaging element 570L.

Similarly, the right-side photographing optical system 500R mainly includes a half mirror 530R, an infrared filter 540R, a diaphragm 550R, an imaging lens 560R, and an imaging element 570R. In the following description, for convenience's sake, the members of the infrared filters 540L and 540R, the diaphragms 550L and 550R, the imaging lenses 560L and 560R, and the imaging elements 570L and 570R will be collectively referred to as imaging units 575L and 575R.

The infrared filters 540L and 540R absorb visible light while passing infrared light. The imaging elements 570L and 570R receive the infrared light that has passed through the infrared filters 540L and 540R.

In the following, imaging for the lateral image will be described with reference to the left-side photographing optical system 500L as an example. The illumination light flux from the illuminating optical system 100 is reflected by the face of the examinee and the eyeglass frame F. The reflected illumination light flux enters the left-side photographing optical system 500L. Thereafter, the illumination light flux is reflected by the half mirror 530L. The light flux reflected by the half mirror 530L passes through the infrared filter 540L. The infrared light that has passed through the infrared filter 540L passes through the diaphragm 550L and is then condensed by the imaging lens 560L, forming an image on the image plane of the imaging element 570L. The imaging element 570L transmits the detected image to the controller 70. Thus, on the imaging element 570L, a lateral image of the left side of the examinee is captured. As in the left-side photographing optical system 500L, a lateral image of the right side of the examinee is captured by the right-side photographing optical system 500R.

<Controller>

Figure 4:
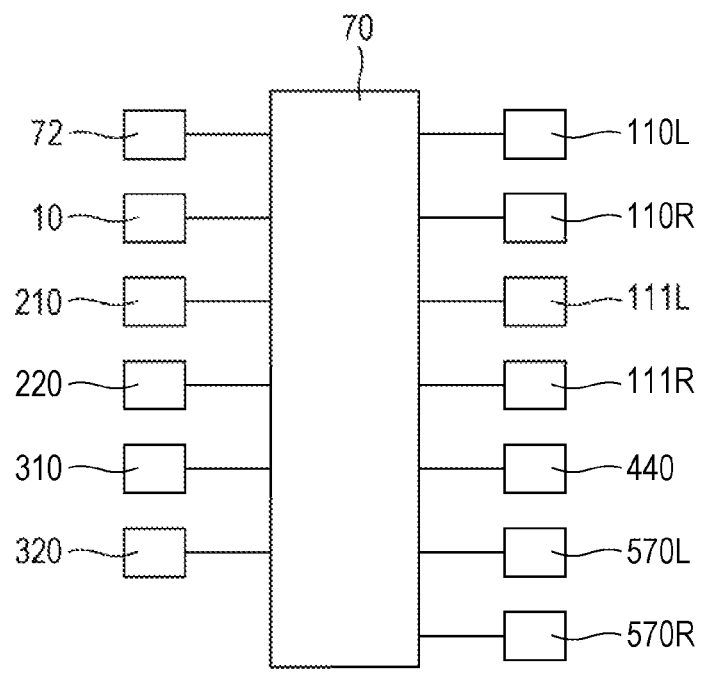
FIG. 4 is a block diagram of a control system according to the present example.

FIG. 4 is a block diagram of a control system used in the present example. The controller 70 includes a CPU (processor), a RAM, and a ROM and the like. The CPU of the controller 70 controls the eyeglass wearing image analysis device 1. The RAM temporarily stores various information. In the ROM of the controller 70, various programs, initial values and the like for controlling the operation of the eyeglass wearing image analysis device 1 are stored.

To the controller 70, there are electrically connected, e.g., a non-volatile memory (which may be hereafter simply referred to as a memory) 72; the operation unit 10; the light sources 110L, 110R, 111L, 111R, 220, and 320; the imaging elements 210, 310, 570L, and 570R; the drive unit for the optical system moving unit 350; and the drive unit 440.

The memory 72 is a non-transitory storage medium capable of holding stored content even if power supply is switched off. Examples of the memory 72 include a hard disk drive, a flash ROM, and a USB memory detachably connected to the eyeglass wearing image analysis device 1. The memory 72 stores a photography control program for controlling the photographing of a distant vision image (frontal image in distant vision state), a near vision image (frontal image in near vision state), and a lateral image by the eyeglass wearing image analysis device 1; and an image processing program for processing the distant vision image, the near vision image, and the lateral image. The memory 72 also stores various photography information, such as information about the photographing position of the distant vision image, the near vision image, and the lateral image that have been photographed. To the operation unit 10, various operation instructions are input by the examiner.

<Control Operation>

Figure 5:
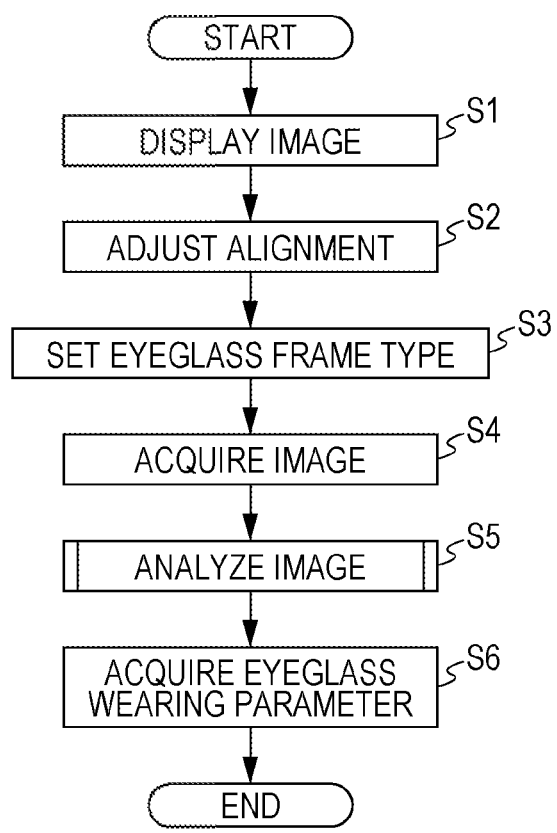
FIG. 5 is a flowchart explaining the flow of a control operation according to the present example.

Hereafter, a control operation according to the present example will be described with reference to FIG. 5. FIG. 5 is a flowchart for describing the flow of the control operation according to the present example. In the present example, the control operation will be described with reference to an image of the examinee in distant vision state. Obviously, however, similar control may be performed with regard to the examinee in near vision state.

<Image Display (S1)>

The examiner operates the operation unit 10 to set the eyeglass wearing image analysis device to a distant photography mode. In the distant photography mode, various optical systems for photographing the examinee in distant vision state are controlled by the controller 70.

When set in the distant photography mode, the controller 70 drives the drive unit 440 so as to set the angle θ of the reflecting mirror 410 of the optical path switching unit 400 to an angle corresponding to the distant photography mode (such as 40° with respect to the horizontal plane (X-Z plane) direction). The reflecting mirror 410 inclined at the angle corresponding to the distant photography mode causes the fixation target light flux from the light source 220 to be emitted horizontally with respect to the examinee's eye E.

<Alignment Adjustment (S2)>

The examiner has the examinee positioned on the face support unit 5. The examiner adjusts the face support unit 5 so that the face of the examinee is disposed in a predetermined position with respect to the eyeglass wearing image analysis device 1. Namely, the examiner performs an alignment adjustment (S2).

Figure 6:
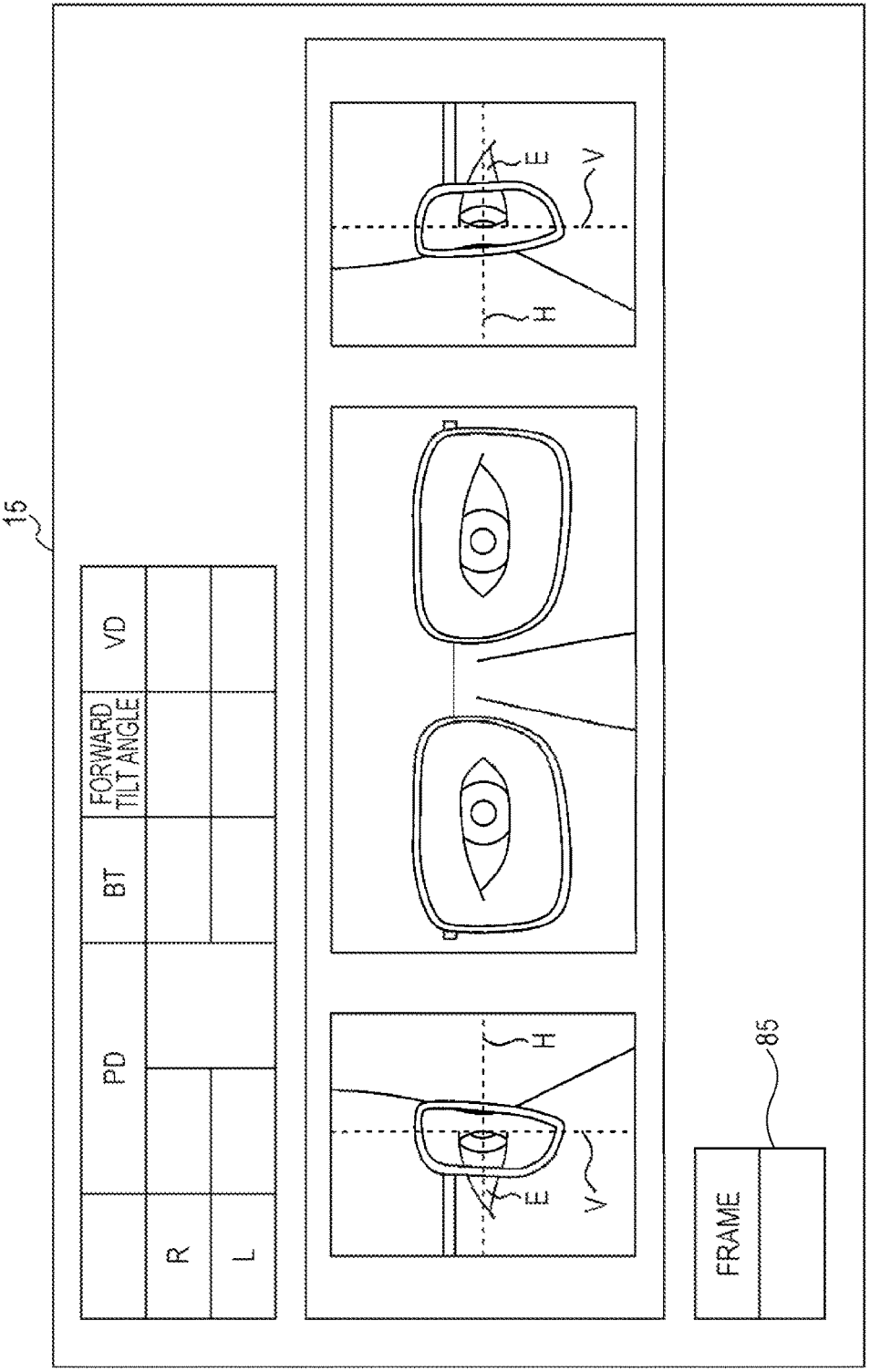
FIG. 6 is a diagram of an example of a display screen of a display unit.

FIG. 6 illustrates an example of a display screen on the display unit 15. For example, in the present example, the distance between the examinee and the eyeglass wearing image analysis device 1 is adjusted so that the corneal apex of the examinee's eye E is displayed at a predetermined position on the display unit 15. In the present example, reference lines V and H indicating the center of the image taken by the lateral photographing optical system 500 are displayed in lateral screens of the display unit 15. In the present example, the eyeglass wearing image analysis device 1 is set such that a proper alignment position is obtained when the intersecting point of the reference lines V and H is aligned with the corneal apex. The examiner confirms the image of the face of the examinee (examinee's face) being displayed on the display unit 15 and performs alignment adjustment.

<Setting of Eyeglass Frame Type (S3)>

The examiner sets the eyeglass frame type (S3). For example, the controller 70 performs control for acquiring an eyeglass wearing parameter based on the eyeglass frame type that has been set (the details will be described later).

Hereafter, the setting of the eyeglass parameter will be described. The controller 70 displays the face of the examinee image on the display unit 15. The controller 70 also displays an eyeglass frame setting switch 85 for setting the eyeglass frame type. The examiner selects the eyeglass frame setting switch 85 by operating the operation unit 10 (see FIG. 6).

When the eyeglass frame type setting switch is selected by the operation, of the operation unit 10, the controller 70 enables the input of the eyeglass frame type (kind of eyeglass frame). For example, the controller 70 causes at least two eyeglass frame types to be displayed next to each other on the display unit 15.

The display unit 15 is configured to set, as the eyeglass frame type, the shape of the eyeglass frame, the material of the eyeglass frame (such as metal, plastic, and Optyl), the color of the eyeglass frame (such as red, blue, yellow, black, and grey), the design of the eyeglass frame (such as dot and border), and eyeglass frame configuration information (such as the target shape of the lens of the eyeglass frame, the warp angle of the eyeglass frame, and the pantoscopic angle of the eyeglass frame). The shape of the eyeglass frame may include full rim, two-point, and Nylor. For example, a full rim is an eyeglass frame having rims all around. An example of the two-point is a rimless type of eyeglass frame with the temples and bridge directly attached to the eyeglass lenses. A Nylor is a partially rimless type of eyeglass frame, for example. In this case, the eyeglass lenses are affixed in rimless portions using nylon thread and the like.

As the eyeglass frame type, at least one of the shapes of the eyeglass frame, the material of the eyeglass frame, the color of the eyeglass frame, and the design of the eyeglass frame may be set. The items of the eyeglass frame type may be individually set. For example, Nylor may be set as the eyeglass frame shape, metal may be set as the eyeglass frame material, and grey may be set as the color of the eyeglass frame.

In order to enable efficient selection of a specific eyeglass frame type, when an item of eyeglass frame type is selected, another predetermined item may be simultaneously set. For example, when one of metal, plastic, and Optyl is selected as the eyeglass frame material, a predetermined full rim may be simultaneously set as the shape of the eyeglass frame. In this case, items of the eyeglass frame type are associated with each other in advance.

The eyeglass frame types are not limited to the above, and various types of eyeglass frame may be set. Obviously, the eyeglass frame type may be added or deleted as desired by the examiner.

In the present example, a case is described in which one of full rim, two-point, and Nylor is set as the shape of the eyeglass frame. In the present example, when the eyeglass frame type setting switch 85 is operated, the controller 70 displays metal plastic, Optyl, two-point, and Nylor as the eyeglass frame types. In the present example, metal, plastic, and Optyl as the material of the eyeglass frame are associated with full rim as the eyeglass frame shape. For example, when one of metal, plastic, and Optyl is selected as the eyeglass frame material, full rim is set as the eyeglass frame shape. Namely, when one of metal, plastic, Optyl, two-point, and Nylor is selected as an eyeglass frame type, one of full rim, two-point, and Nylor is selected as an eyeglass frame type.

The examiner selects the eyeglass frame type worn by the examinee from the eyeglass frame types being displayed on the display unit 15. The controller 70 sets the eyeglass frame type selected by the examiner as the eyeglass frame type worn by the examinee. Thus, the eyeglass frame type is set, In the present example, the controller 70 causes the eyeglass frame types to be displayed side by side for setting the eyeglass frame type. From among the displayed eyeglass frame types, an appropriate type is selected. However, the manner of setting of the eyeglass frame type is not limited to the present example, and any method may be used as long as the eyeglass frame type can be set. For example, the eyeglass frame type is input by the examiner operating the operation unit 10. In this case, the controller 70 sets the eyeglass frame type based on the eyeglass frame type information input by the examiner.

<Image Acquisition (S4)>

When position adjustment of the face of the examinee and the eyeglass frame type setting are completed, the examiner touches a photography button which is displayed in the display unit 15 but not illustrated. When the photography button is touched, the controller 70 captures an image (a frontal image and a lateral image) of the examinee in distant vision state (S4). In this way, a distant vision state image is acquired.

<Image Analysis Process (S5) and Eyeglass Wearing Parameter Acquisition (S6)>

When the image is acquired, the controller 70 performs an acquired image analyzing process (S5). In the present example, the controller 70 acquires an eyeglass wearing parameter based on the eyeglass frame type that has been set. For example, in the present example, the controller 70 selects an analyzing process method for analyzing and processing the image of the examinee wearing eyeglasses based, on the eyeglass frame type set. Based on the selected analyzing process method, the controller 70 analyzes the image.

During the image analysis, the controller 70 defects eyeglass frame information and the examinee's pupil information and the like. Based on the detected result, the controller 70 calculates an eyeglass parameter of the examinee's eye E in accordance with the eyeglass frame (the details will be described later). In the present example, the image analysis is automatically started upon acquisition of the image. However, the image analysis is not limited to the present example. For example, the starting of analysis may be set by examiner. The examiner may select an image analysis mode not shown by operating the operation unit 10. When the image analysis mode is selected by the examiner, the controller 70 starts an image analysis.

The eyeglass wearing parameter may include pupil information (such as pupil position and pupil diameter) and eyeglass frame information (such as frame width and frame position). The eyeglass wearing parameter may also include the pupillary distance and eye position height (fitting point height) determined from the pupil information and frame information. By extracting the frame portion from the lateral image, other eyeglass wearing parameters (such as frame pantoscopic angle and eyeglass wearing distance) may be calculated.

Hereafter, the image analysis process according to the present example will be described. In the present example, the image analysis process (S5) for the image of the examinee in distant vision state will be described. Obviously, image analysis for the examinee in near vision state may be similarly performed.

Figure 7:
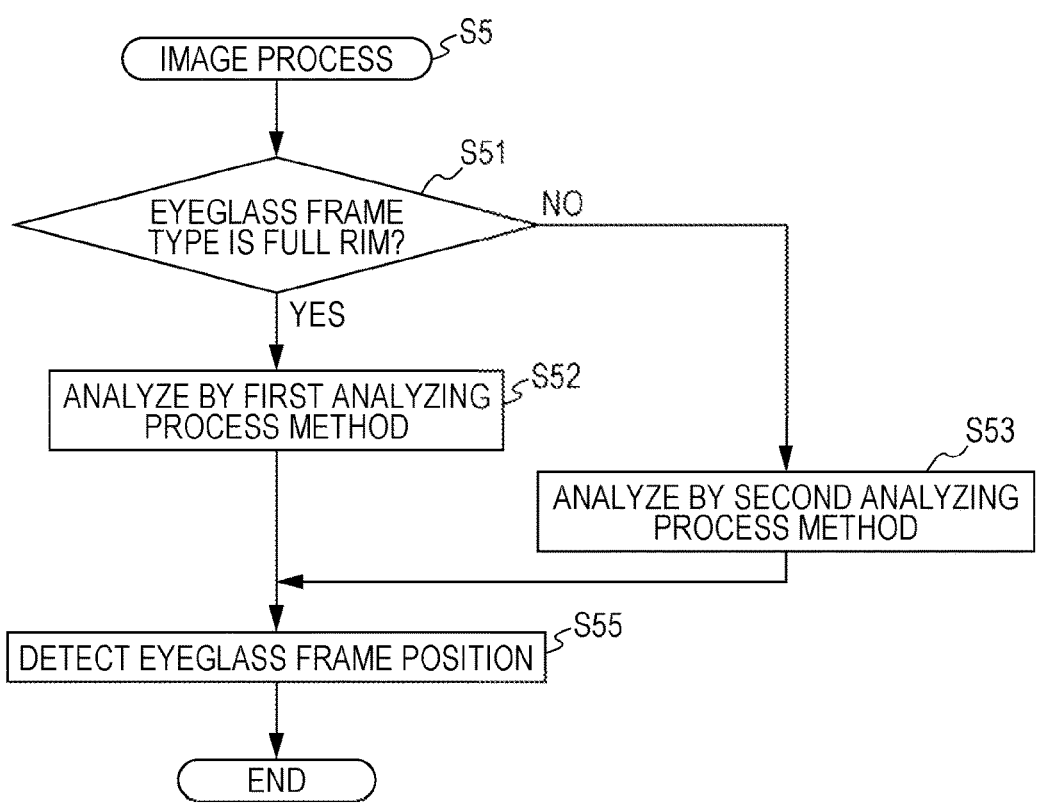
FIG. 7 is a flowchart explaining an image analysis process based on eyeglass frame type.

FIG. 7 is a flowchart of the image analysis process based on the eyeglass frame type. In the present example, the controller 70 selects the analyzing process method for analyzing and processing the image of the examinee wearing eyeglasses, based on the eyeglass frame type that has been set. In the present example, a case will be described in which the eyeglass frame position is detected by analyzing and processing the image of the examinee based on the eyeglass frame type. Obviously, it is also possible to detect other portions of the examinee image (such as the pupil position or eyebrow).

In the present example, the controller 70 determines whether the detection of the eyeglass frame position by image processing is easy. Based on the determination, the controller 70 selects the analyzing process method (S51). Based on the selected analyzing process method, the controller 70 analyzes and processes the image.

When the eyeglass frame is of a type with rims throughout, such as a full rim (the type having rims extending all around), it is easy to recognize the eyeglass frame portion (eyeglass frame boundary) because of the thickness of the eyeglass frame. Thus, in the case of the detection by image processing, it is easy to detect the eyeglass frame position by image processing. When the eyeglass frame is of a rimless or partially rimless type, such as a two-point or Nylor, the edge of the lens may form an eyeglass frame boundary portion. In the case of the detection by image processing, it may be difficult to detect the eyeglass frame position by image processing.

Thus, in the present example, the analyzing process method is selected based on whether the eyeglass frame type is full rim. When the eyeglass frame type is full rim, the controller 70 selects a first analyzing process method, and performs the photographed image analyzing process according to the first analyzing process method (S52). When the eyeglass frame type is not full rim, the controller 70 selects a second analyzing process method, and performs the photographed image analyzing process according to the second analyzing process method (S53).

Hereafter, the analyzing process method will be described. In the present example, the controller 70 first scans the examinee image in X and Y directions successively, and acquires a luminance distribution of the image. The controller 70 then detects the eyeglass frame edge from the acquired luminance distribution. For example, the controller 70 detects the edge based on whether an amount of luminance transition between adjacent pixels in the acquired luminance distribution exceeds a predetermined threshold value. Obviously, the edge may be detected based on whether the luminance value at each pixel exceeds a predetermined threshold value. In the present example, the controller 70 detects the eyeglass frame edge when the amount of luminance transition exceeds the predetermined threshold value. The controller 70 detects the detected edge as the eyeglass frame position (S55).

In the present example, threshold values that are different from the values used in the first analyzing process method are used for detecting the eyeglass frame edge in the second analyzing process method. For example, the threshold value used in the first analyzing process method is set higher than the threshold value used in the second analyzing process method. Specifically, the eyeglass frame that enables easy detection of the eyeglass frame position, such as a full rim, has a large luminance value change (amount of luminance transition). In this case, the eyeglass frame edge can be easily detected even when the threshold value is set high. Thus, the controller 70 can detect the eyeglass frame edge even when the threshold value is set high. When the threshold value is high, noise is not readily detected around the eyeglass frame portion, so that the eyeglass frame can be detected in a more preferable manner.

On the other hand, the threshold value used in the second analyzing process method is set lower than the threshold value used in the first analyzing process method. Specifically, in the image of an eyeglass frame in which detection of the eyeglass frame position is difficult, such as in the case of a two-point or Nylor, the luminance value transition is smaller. Thus, if a high threshold value is used for detecting the eyeglass frame edge as in the case of the first analyzing process method, detection of the eyeglass frame edge may become difficult. In the present example, the second analyzing process method with the lower threshold value is used. In this way, the controller 70 can detect the eyeglass frame edge in a preferable manner.

As described above, the image analysis process is performed based on the eyeglass frame type. As a result, the eyeglass frame position is detected in a preferable manner.

The threshold values used in the first analyzing process method and the second analyzing process method may be such that the eyeglass frame can be detected. For example, the examinee is asked to wear various types of eyeglass frames in advance, and the examinee is then photographed to obtain images based on which the threshold values that enable detection of luminance value transition due to the eyeglass frame portion is calculated. In this way, the threshold values used in the analyzing process method are set. For example, in the present example, various full-rim eyeglass frames are worn by the examinee, and the threshold value enabling detection of luminance value transition due to the eyeglass frame portion is calculated from the photographed examinee images. In this way, the threshold value for the first analyzing process method is set. Further, in the present example, various two-point or Nylor eyeglass frames are worn by the examinee, and the threshold value enabling detection of luminance value transition due to the eyeglass frame portion is calculated from the photographed examinee images. In this way, the threshold value for the second analyzing process method is set. The threshold values may be modified as needed.

In the analyzing process method according to the present example, the image processing is implemented by selecting the analyzing process methods with different edge detection threshold values. However, the analyzing process method used in the present embodiment is not limited to the above. For example, the image processing may be performed by an analyzing process method selected based on the eyeglass frame type. The first analyzing process method and the second analyzing process method may employ different computing process methods. In the first analyzing process method used when the eyeglass frame detection is easy, an analyzing process method with high processing speed may be used, whereas in the second analyzing process method used when the eyeglass frame detection is difficult, an analyzing process method with lower processing speed but having higher detection accuracy may be used. Thus, by selecting an appropriate analyzing process method in accordance with the eyeglass frame type, the eyeglass wearing parameter can be acquired in a more preferable manner.

FIG. 8 illustrates an example of a screen displayed on the display unit 15 at the end of the photographed image analysis. As illustrated in FIG. 8, the controller 70 displays photographed images including a frontal image 620, a left lateral image 621, and a right lateral image 622, for example.

The frontal image 620 includes, for example, frontal images of the examinee's both eyes and the eyeglass frame. Obviously, the frontal image 620 may include frontal images of one of the examinee's left and right eyes and the eyeglass frame.

The left lateral image 621 is a left lateral image (side image) of the face of the examinee taken by the lateral imaging optical system 500L. In other words, the left lateral image 621 is an image of the examinee as viewed from the right-hand direction of the examiner facing the examinee. The left lateral image 621 includes the examinee's left, eye, and a left lateral image of the eyeglass frame.

The right lateral image 622 is a right lateral image (side image) of the face of the examinee taken by the lateral imaging optical system 500R. In other words, the right lateral image 622 is an image of the examinee as viewed from the left-hand direction of the examiner facing the examinee. The right lateral image 622 includes the examinee's right eye and a right lateral image of the eyeglass frame.

In the present example, the controller 70 displays, as the image analysis result, targets at the eyeglass frame position on the photographed image on the display unit 15 in a superposed manner. The targets are displayed based on the detection result obtained by image analysis. The controller 70 also detects the examinee's pupil position by an image analysis process and displays a target at the examinee's pupil position on the photographed image in a superposed manner. For example, the controller 70 displays a target indicating the eyeglass frame position (eyeglass frame position target) F and a target indicating the examinee's pupil position (pupil, position target) P. The targets may be displayed in various display modes on the display unit 15, such as a cross mark and a line. In the present example, as the eyeglass frame position, a lens lower end LT indicating a predetermined portion in the eyeglass frame is displayed. Obviously, the portion displayed as the eyeglass frame position is not limited to the lens lower end. The portion displayed as the eyeglass frame position may be any portion of the eyeglass frame. For example, the portion displayed as the eyeglass frame position may be the eyeglass frame as a whole. For example, the portion displayed as the eyeglass frame position may be the upper end of the lens as a predetermined portion in the eyeglass frame (upper end of the eyeglass frame), or the bridge of the eyeglass frame.

In the present example, the display unit 15 displays, for example, a target BT indicating the eye position height (eye position height target) calculated based on the detection result, and a target PD indicating the pupillary distance in distant vision state (pupillary distance target), which targets are superposed on the photographed image. For example, the pupillary distance PD is the distance between the left and right pupil centers. Not only are the eye position height and the pupillary distance and the Like that have been calculated based on the detection result displayed via the targets, but also their measurement values are displayed on the display screen of the display unit 15. For example, in measurement value display columns 80 displayed on the display unit 15, measurement values of the eye position height and pupillary distance and the like are shown. The eyeglass wearing parameter acquired by analysis is stored in the memory 72. In this way, the eyeglass wearing parameter is acquired.

As described above, the eyeglass wearing parameter is acquired by an analyzing process method based on the eyeglass frame type, whereby the eyeglass wearing parameters can be acquired in a preferable manner.

The examiner may transmit the acquired data (such as the eyeglass wearing parameter and the eyeglass frame type) to an external device by selecting a transmission switch which is not shown. For example, when the transmission switch is selected by the examiner, the controller 70 transmits the eyeglass frame type (eyeglass frame type information) to the external device together with the acquired eyeglass wearing parameter. Obviously, the controller 70 may be configured to transmit the acquired data to the external device automatically upon completion of the acquisition of the eyeglass wearing parameter.

Examples of the external device include a lens processing device, a tracer, and a blocker. Because the eyeglass frame type is transmitted to the external device together with the eyeglass wearing parameters, there is no need for the examiner to set various information in the external device, such as the eyeglass wearing parameter and the eyeglass frame type. Thus, smooth transition to the next operation can be performed, for example. When a common eyeglass frame type is stored in a memory of the external device and the eyeglass wearing image analysis device, the devices can be easily associated with each other.

In order to transmit the acquisition data, the external device may be connected with the eyeglass wearing image analysis device, or configured to communicate with the eyeglass wearing image analysis device wirelessly, for example. The eyeglass wearing image analysis device may be configured to cause the external device to receive data using a flash ROM or a USB memory, for example. In this case, the examiner can cause the external device to acquire and store the acquired data by connecting the flash ROM or USB memory and the like, with the acquired data stored therein, to the external device.

<Modification>

In the foregoing embodiment, the acquisition of the eyeglass wearing parameter has been described as a control operation based, on the eyeglass frame type information. However, the control operation is not limited to the control operation according to the present example. It is only required that the control operation he performed based on the eyeglass frame type. The eyeglass frame type information may be used when the respective members of the device are controlled. The eyeglass frame type information may be used when the eyeglass wearing parameter is acquired. In this way, an appropriate control operation in accordance with the eyeglass frame type can be performed. As a result, the examinee wearing an eyeglass frame can be photographed and measured in a preferable manner (the details will be described later).

When the eyeglass frame type information is used when controlling the respective members of the device, the control operation may include light amount adjustment of the light source of each optical system, gain adjustment of an imaging element of each optical system, and adjustment of the position of each optical system. For example, when light amount adjustment of the light source of each optical system is performed based on the eyeglass frame type information, if the eyeglass frame type is different from the full rim type, the controller 70 may increase the light amount of the light source of at least one optical system so that the eyeglass frame portion can be clearly shown. When gain adjustment of the imaging element of each optical system is performed based on the eyeglass frame type information, if the eyeglass frame type is not full rim, the controller 70 may increase the gain of the imaging element of at least one optical system so that a luminance transition due to the eyeglass frame portion can be acquired. Further, when adjustment of the position of each optical system is performed based on the eyeglass frame type information, the controller 70 may adjust the angle of the reflecting mirror 410 so that the eyeglass frame worn by the examinee can be photographed in a preferable manner. Thus, by controlling the respective members of the eyeglass wearing image analysis device based on the eyeglass frame type information, it becomes possible to acquire various images and calculate the eyeglass wearing parameter and the like in a preferable manner.

As described above, the acquisition of the eyeglass wearing parameter based on the eyeglass frame type information includes selecting the analyzing process method for the image analysis process in accordance with the eyeglass frame type. In accordance with the eyeglass frame type, the eyeglass wearing parameter may be corrected. In this case, for example, the controller 70 corrects the eye position height (such as the distance between the lens lower end and the pupil position) in accordance with the eyeglass frame type. For example, when the eyeglass frame type is full rim, the eyeglass lens should have a bevel portion for fitting the lens in the rim. Thus, the lower end of the lens may be longer by the length of the bevel portion. Accordingly, when the eyeglass frame type is full rim, the eye position height may be corrected in consideration of the bevel portion. Obviously, the eyeglass wearing parameter that can be corrected in accordance with the eyeglass frame type is not limited to the above. The eyeglass wearing parameter that may be modified includes any eyeglass wearing parameters related to the position or distance that is modified based on the eyeglass frame type information. Examples of such parameter include the distance from the lens upper end to the pupil position, the left or right end of the lens (such as the boundary position between the eyeglass frame and the lens on the left, or right side), and the pupillary distance PD. Thus, the eyeglass wearing parameter can be acquired based on the eyeglass frame type information. Accordingly, it becomes possible, for example, to acquire layout data and the like in accordance with the eyeglass frame type as acquired data for being transmitted to the eyeglass lens processing device and the like. Namely, the examiner can be exempted from the need to set various information, such as the eyeglass wearing parameter and the eyeglass frame type, in the external device. Thus, work using the lens processing device and the like can be smoothly performed, and the examiner can perform preferable lens processing and the like corresponding to the eyeglass frame type.

In the present embodiment, the timing for setting the eyeglass frame type is not limited to the timing described in the example. For example, the eyeglass frame type may be set prior to image display (S1) or alignment adjustment (S2), or after image acquisition (S4), image analysis (S5), or eyeglass wearing parameter acquisition (S6). In this case, the controller 70 may be configured to correct the acquired eyeglass wearing parameter in accordance with the eyeglass frame type that has been set.

In the present example, the various data acquired by the eyeglass wearing image analysis device are transmitted. However, the processing of the acquired data in the present embodiment is not limited by the present example. For example, the various acquired data may be printed.

In the present embodiment, the frontal image and the lateral image used for acquiring the eyeglass wearing parameter is not limited to a single image used for detecting the eyeglass frame and the examinee's eye. The eyeglass frame and examinee's eye may be detected from a plurality of photographed images so as to acquire the eyeglass wearing parameter. In this case, for example, a plurality of frontal images (such as a left eye frontal image and a right eye frontal image) are taken as the frontal image, and the eyeglass wearing parameter may be acquired for each of the left and right eyes. A plurality of photographed images including a photographed image of the eyeglass frame and a photographed image of the examinee's eye may be acquired. The eyeglass wearing parameter may be acquired by acquiring the eyeglass frame information and the examinee's pupil information respectively from the plurality of acquired photographed images.

In the present example, the eyeglass wearing parameter is detected fully automatically by image analysis. However, the parameter detection performed in the present embodiment is not limited to the present example. For example, the eyeglass wearing parameter may be detected partially manually. When the detection is performed manually and automatically, first an image analysis of the photographed image is performed automatically. For example, as shown in FIG. 7, targets are displayed on the photographed image based on the detection result. Here, the examiner can move the targets displayed on the photographed image from their displayed positions by operating the operation unit 10. Then, from the photographed image after the target positions have been moved, the eyeglass wearing parameter is acquired. Namely, the measurement values in the measurement value display columns 80 are also modified as the targets are moved.

In the present example, the targets indicating the eyeglass wearing parameter are superposed on the photographed image when displayed. However, the display of the targets in the present embodiment is not limited by the present example. The targets indicating the eyeglass wearing parameter may be displayed on the display screen of the display unit 15.

In the present example, the image analysis process is performed on the image taken using the optical system in which the fixation target presentation position is modified by modifying the angle of the reflecting mirror 410. However, the image subjected to image analysis according to the present embodiment is not limited by the present example. The image analysis process performed according to the present embodiment may be applied to any image taken of the examinee wearing eyeglasses. Namely, the optical systems for taking the image is not limited to the optical systems of the present example, and various optical systems may be applied.

In the foregoing embodiment, in order to acquire the left and right side lateral images, the lateral photographing optical system 500 includes the left-side photographing optical system 500L disposed on the left side of the examinee, and the right-side photographing optical system 500R disposed on the right side of the examinee. However, the lateral photographing optical systems used in the present embodiment are not limited by the present example. The lateral photographing optical systems may be configured such that a single photographing optical system is shared. Namely, in order to acquire the left and right side lateral images, a single lateral photographing optical system may be used. In this case, for example, the left and right sides may be photographed by driving a reflecting mirror. The left and right sides may be photographed by moving the lateral photographing optical system. Further, the left and right side lateral images may be acquired by using the measuring optical system for the frontal image photography. In this case, the left and right side lateral images may be acquired as the frontal image photography optical system is moved.

In the present example, the far measuring optical system 200 and the near measuring optical system 300 are separately provided. However, the optical systems used in the present embodiment are not limited by the present example. The images in distant vision state and near vision state may be taken by using at least one of the optical systems. In this case, based on the eyeglass wearing parameter acquired from one of the images in distant vision state or near vision state, the other eyeglass wearing parameter may be acquired.

In the present embodiment, a device for acquiring the eyeglass wearing parameter by using an eyeglass frame to which an attachment or seal and the like is attached may be used. For example, the image analysis device according to the present embodiment may be used when detecting the attachment or seal and the like as a marker attached to the eyeglass frame on a photographed image of the eyeglass frame.

The eyeglass wearing image analysis device 1 according to the present example is configured to take the examinee's image using a plurality of imaging optical systems included in the device. However, the configuration of the image analysis device according to the present embodiment is not limited to the above. For example, the image analysis device according to the present embodiment may not be provided with the imaging optical systems. In this case, the image data of the examinee's image taken by an imaging optical system outside the image analysis device may be received by the image analysis device via various data communication units. Based on the received image, the eyeglass wearing parameter of the examinee can be measured.

The image analysis device used in the embodiment of the present disclosure is not limited to the device described with reference to the present example. For example, eyeglass wearing image analysis software (program) described in the example may be supplied to the system or device via a network or various storage media. The supplied program may be read and executed by a computer of a system or device (such as a CPU).

The eyeglass wearing image analysis software (program) may be stored in a non-transitory computer-readable storage medium (storage medium), such as an optical disk, a magnetooptical disk, a magnetic disk, or a flash memory.

The eyeglass wearing image analysis device according to embodiments of the present disclosure may include the following first through ninth eyeglass wearing image analysis devices.

The first eyeglass wearing image analysis device for analyzing an image of an examinee wearing eyeglasses and measuring an eyeglass wearing parameter of the examinee includes an acquisition means that acquires eyeglass frame type information, and a controller that performs a control operation based on the eyeglass frame type information.

The second eyeglass wearing image analysis device corresponds to the first eyeglass wearing image analysis device wherein the controller performs control for acquiring an eyeglass wearing parameter based on the eyeglass frame type information.

The third eyeglass wearing image analysis device corresponds to the second eyeglass wearing image analysis device wherein the controller selects an analyzing process method for analyzing and processing the image of the examinee wearing eyeglasses based on the eyeglass frame type information, and performs control for analyzing the image based on the selected analyzing process method.

The fourth eyeglass wearing image analysis device corresponds to the first to the third eyeglass wearing image analysis devices wherein the controller performs control for correcting the eyeglass wearing parameter based on the eyeglass frame type information.

The fifth eyeglass wearing image analysis device corresponds to the first to the fourth eyeglass wearing image analysis devices wherein the controller corrects the eyeglass wearing parameter based on at least one of a warp angle and a pantoscopic angle as the eyeglass frame type information.

The sixth eyeglass wearing image analysis device corresponds to any of the first to the fifth eyeglass wearing image analysis devices, further including a transmission means for transmitting the eyeglass wearing parameter to an external device together with the eyeglass frame type information.

The seventh eyeglass wearing image analysis device corresponds to the first eyeglass wearing image analysis device wherein the controller performs a first control operation corresponding to a first eyeglass frame type, and a second control operation different from the first control operation and corresponding to a second eyeglass frame type different from the first eyeglass frame type.

The eighth eyeglass wearing image analysis device for analyzing an image of an examinee wearing eyeglasses and measuring an eyeglass wearing parameter of the examinee is provided with a controller that performs a first control operation corresponding to a first eyeglass frame type and a second control operation different from the first control operation and corresponding to a second eyeglass frame type different from the first eyeglass frame type.

The ninth eyeglass wearing image analysis device for analyzing an image of the examinee wearing eyeglasses and measuring an eyeglass wearing parameter of the examinee is provided with an acquisition means that acquires eyeglass frame type information; a selection means that, based on the eyeglass frame type information, selects a first analyzing process method when the eyeglass frame type is full rim, or a second analyzing process method different from the first analyzing process method when the eyeglass frame type is not full rim; and a controller that performs an image analyzing process based on the analyzing process method selected by the selection means.

An eyeglass wearing image analysis method for analyzing an image of an examinee wearing eyeglasses and measuring an eyeglass wearing parameter of the examinee according to an embodiment of the present disclosure may include an acquisition step of acquiring eyeglass frame type information; and a control step of performing a control operation based on the frame type information.

An eyeglass wearing image analysis program according to an embodiment of the present disclosure may be the following first or second eyeglass wearing image analysis program.

The first eyeglass wearing image analysis program is an eyeglass wearing image analysis program for causing an eyeglass wearing image analysis device to execute the eyeglass wearing image analysis method.

The second eyeglass wearing image analysis program is an eyeglass wearing image analysis program executed in an eyeglass wearing image analysis device for analyzing an image of an examinee wearing eyeglasses and measuring an eyeglass wearing parameter of the examinee, the eyeglass wearing image analysis program causing, when executed by a processor of the eyeglass wearing image analysis device, the eyeglass wearing image analysis device to execute an acquisition step of acquiring eyeglass frame type information; and a control step of performing a control operation based on the frame type information.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An eyeglass wearing parameter measuring device for measuring an eyeglass wearing parameter for manufacturing eyeglasses, comprising:
    an optical system comprising a light source and an imaging element;
    an acquisition unit that acquires eyeglass frame type information comprising at least one selected from a group consisting of a shape of an eyeglass frame, a material of the eyeglass frame, a design of the eyeglass frame and eyeglass frame configuration information;
    a controller that analyses an image of an examinee and determines an eye position height in the image from a distance from a frame position to each of the pupil positions, the eye position height being determined based on the at least one selected from the group consisting of the shape of the eyeglass frame, the material of the eyeglass frame, the design of the eyeglass frame and the eyeglass frame configuration information; and
    a transmission unit that outputs the determined eye position height,
    wherein the controller controls the light source to adjust a light amount of the light source based on the at least one selected from the group consisting of the shape of the eyeglass frame, the material of the eyeglass frame, the design of the eyeglass frame and the eyeglass frame configuration information, or the controller controls the imaging element to adjust a gain of the imaging element based on the at least one selected from the group consisting of the shape of the eyeglass frame, the material of the eyeglass frame, the design of the eyeglass frame and the eyeglass frame configuration information.

2. The eyeglass wearing parameter measuring device according to claim 1, wherein the controller selects, based on the eyeglass frame type information, an analyzing process method for analyzing and processing an image of an examinee wearing eyeglasses, and performs an image analyzing process based on the selected analyzing process method.

3. The eyeglass wearing parameter measuring device according to claim 1, wherein the controller corrects the eyeglass wearing parameter based on the eyeglass frame type information.

4. The eyeglass wearing parameter measuring device according to claim 1, wherein the controller corrects the eyeglass wearing parameter based on at least one of a warp angle and a pantoscopic angle as the eyeglass frame type information.

5. The eyeglass wearing parameter measuring device according to claim 1, wherein the transmission unit transmits the eyeglass frame type information and the determined eye position height to an external device.

6. The eyeglass wearing parameter measuring device according to claim 1, comprising a selection unit that selects, based on the eyeglass frame type information which indicates if an eyeglass frame type is full rim or different from full rim, a first analyzing process method when an eyeglass frame type is the full rim, or a second analyzing process method different from the first analyzing process method when the eyeglass frame type is different from the full rim, wherein the controller performs an image analyzing process based on the analyzing process method selected by the selection unit.

7. A non-transitory storage medium storing an eyeglass wearing parameter measuring program for causing a computer to function as an eyeglass wearing parameter measuring device for measuring an eyeglass wearing parameter for manufacturing eyeglasses, wherein the eyeglass wearing parameter measuring device implements:
   acquisition of eyeglass frame type information comprising at least one selected from a group consisting of a shape of an eyeglass frame, a material of the eyeglass frame, a design of the eyeglass frame and eyeglass frame configuration information;
   control of a light source to adjust a light amount of the light source based on the at least one selected from the group consisting of the shape of the eyeglass frame, the material of the eyeglass frame, the design of the eyeglass frame and the eyeglass frame configuration information, or control of an imaging element to adjust a gain of the imaging element based on the at least one selected from the group consisting of the shape of the eyeglass frame, the material of the eyeglass frame, the design of the eyeglass frame and the eyeglass frame configuration information;
   analysis an image of an examinee and determination of an eye position height in the image from a distance from a frame position to each of the pupil positions, the eye position height being determined based on the at least one selected from the group consisting of the shape of the eyeglass frame, the material of the eyeglass frame, the design of the eyeglass frame and the eyeglass frame configuration information; and
   output of the determined eye position height.

8. The eyeglass wearing parameter measuring device according to claim 1, wherein the controller further determines an eyeglass wearing distance based on the eyeglass frame type information.

9. The eyeglass wearing parameter measuring device according to claim 6, wherein the first analyzing process method and the second analyzing process method are for detecting the eyeglass frame.

10. The eyeglass wearing parameter measuring device according to claim 1, wherein the transmission unit outputs the determined eye position height to a display unit.

11. The eyeglass wearing parameter measuring device according to claim 1, wherein the transmission unit outputs the determined eye position height to a display unit for displaying the determined eye position height on the display unit.

12. The eyeglass wearing parameter measuring device according to claim 1, wherein the transmission unit transmits the determined eye position height to at least one selected from a group consisting of a lens processing device, a tracer and a blocker.

13. The eyeglass wearing parameter measuring device according to claim 1, wherein the transmission unit transmits the determined eye position height to at least one selected from a group consisting of a lens processing device, a tracer and a blocker, for lens processing based on the eyeglass frame type information.

14. The non-transitory storage medium according to claim 7, wherein the eyeglass wearing parameter measuring device implements outputs of the determined eye position height to a display unit for displaying the determined eye position height on the display unit.

15. The non-transitory storage medium according to claim 7, wherein the eyeglass wearing parameter measuring device implements transmission of the determined eye position height to at least one selected from a group consisting of a lens processing device, a tracer and a blocker, for lens processing based on the eyeglass frame type information.

* * * * *